US012582161B2

(12) United States Patent
Surani et al.

(10) Patent No.: US 12,582,161 B2
(45) Date of Patent: Mar. 24, 2026

(54) VAPORIZING DEVICE

(71) Applicant: Boon, LLC, Dallas, TX (US)

(72) Inventors: Amin Surani, Euless, TX (US); Amir Surani, Waco, TX (US)

(73) Assignee: Boon, LLC, Dallas, TX (US)

( * ) Notice: Subject to any disclaimer, the term of this patent is extended or adjusted under 35 U.S.C. 154(b) by 351 days.

(21) Appl. No.: 18/450,325

(22) Filed: Aug. 15, 2023

(65) Prior Publication Data

US 2025/0057217 A1     Feb. 20, 2025

(51) Int. Cl.
| | |
|---|---|
| *A24F 40/40* | (2020.01) |
| *A24F 7/00* | (2006.01) |
| *A24F 40/30* | (2020.01) |
| *A24F 40/60* | (2020.01) |
| *A24F 40/90* | (2020.01) |
| *H01M 10/44* | (2006.01) |
| *H01M 10/48* | (2006.01) |
| *H01M 50/247* | (2021.01) |

(Continued)

(52) U.S. Cl.
CPC .............. *A24F 40/40* (2020.01); *A24F 7/00* (2013.01); *A24F 40/30* (2020.01); *A24F 40/60* (2020.01); *A24F 40/90* (2020.01); *H01M 10/44* (2013.01); *H01M 10/488* (2013.01); *H01M 50/247* (2021.01); *H02J 7/0045* (2013.01); *H02J 7/0048* (2020.01); *H02J 7/0063* (2013.01); *A24F 40/10* (2020.01); *H01M 2220/30* (2013.01)

(58) Field of Classification Search
None
See application file for complete search history.

(56) References Cited

U.S. PATENT DOCUMENTS

| | | | | |
|---|---|---|---|---|
| 7,293,565 B2 * | 11/2007 | Griffin | ................. | H02J 7/0044 |
| | | | | 131/329 |
| 9,936,733 B2 | 4/2018 | Ampolini | | |

(Continued)

FOREIGN PATENT DOCUMENTS

| | | |
|---|---|---|
| CN | 112133848 A | 12/2020 |
| CN | 212164908 U * | 12/2020 |

(Continued)

OTHER PUBLICATIONS

CN_212164908's English Translation (Year: 2025).*

*Primary Examiner* — Manley L Cummins, IV
(74) *Attorney, Agent, or Firm* — Goff IP Law PLLC; Jared S. Goff

(57)     ABSTRACT

A vaporizing device can include a pod including a pod battery to power the pod to produce and emit vapor through a mouthpiece. The pod can be a single-use disposable vaporizing device pod. The vaporizing device can also include a power bank including a power bank battery. The power bank and the pod can be structured to fit together in a combined configuration. The power bank battery can charge the pod battery with the power bank and the pod fit together and electrically connected to each other in the combined configuration. The pod can produce and emit vapor in a standalone configuration wherein the pod is not fit together with the power bank or electrically connected to the power bank. Also, the pod can produce and emit vapor in the combined configuration wherein the pod is fit together with the power bank and electrically connected to the power bank.

7 Claims, 5 Drawing Sheets

(51) Int. Cl.
  *H02J 7/00* (2006.01)
  *A24F 40/10* (2020.01)

(56) References Cited

U.S. PATENT DOCUMENTS

| | | | |
|---|---|---|---|
| 10,194,697 B2 | 2/2019 | Fernando |
| 10,276,898 B2 | 4/2019 | Leadley |
| 10,326,289 B2 | 6/2019 | Bernauer |
| 10,517,326 B2 | 12/2019 | Sur |
| 10,537,140 B2 | 1/2020 | Seidenfeld |
| 10,687,558 B2 | 6/2020 | Qiu |
| 10,770,913 B2 | 9/2020 | Schennum |
| 10,855,092 B2 | 12/2020 | Stanimirovic |
| 10,888,125 B2 | 1/2021 | Anderson |
| 11,000,070 B2 | 5/2021 | Anton |
| 11,083,228 B2 | 8/2021 | Memari |
| 11,213,075 B2 | 1/2022 | Fernando |
| 11,245,281 B2 | 2/2022 | Fernando |
| 11,303,142 B2 | 4/2022 | Holzherr |
| 11,304,447 B2 | 4/2022 | Mead |
| 11,316,213 B2 | 4/2022 | Gratton |
| 11,452,314 B2 | 9/2022 | Ono |
| 11,457,669 B2 | 10/2022 | Fernando |
| 11,462,926 B2 | 10/2022 | Schennum |
| 11,502,524 B2 | 11/2022 | Stanimirovic |
| 11,576,234 B2 | 2/2023 | Gill |
| 11,589,421 B2 | 2/2023 | Davis |
| 12,213,535 B2* | 2/2025 | Verleur | A24F 40/90 |
| 2014/0000638 A1* | 1/2014 | Sebastian | A24F 40/30 |
| | | | 131/328 |
| 2018/0013175 A1* | 1/2018 | Liu | A24F 40/40 |
| 2019/0239559 A1 | 8/2019 | Srour |
| 2019/0387803 A1 | 12/2019 | Yamada |
| 2020/0266642 A1 | 8/2020 | Alt |
| 2020/0323266 A1 | 10/2020 | Wright |
| 2020/0373773 A1 | 11/2020 | Harris |
| 2020/0397056 A1 | 12/2020 | Adams |
| 2021/0337878 A1 | 11/2021 | Gretton |
| 2022/0115883 A1 | 4/2022 | Illidge |
| 2022/0175050 A1* | 6/2022 | Harden | A24F 40/95 |
| 2022/0256933 A1 | 8/2022 | Harden |
| 2022/0273038 A1 | 9/2022 | Xu |

FOREIGN PATENT DOCUMENTS

| | | |
|---|---|---|
| CN | 112220115 A | 1/2021 |
| CN | 113826957 A | 12/2021 |
| CN | 215075565 U | 12/2021 |
| EP | 3711583 A1 | 9/2020 |
| EP | 3791735 A1 | 3/2021 |
| GB | 2593118 A | 9/2021 |
| RU | 2658215 C1 | 6/2018 |
| WO | 2020117338 A1 | 6/2020 |

* cited by examiner

VAPORIZING DEVICE

FIELD

The present disclosure relates to vaporizing devices.

BACKGROUND

Vaporizing devices, also called vape devices or electronic cigarettes, are devices that produce an aerosol mist or vapor to be inhaled by a user. Such devices are often powered by batteries within the devices, where the batteries power an atomizer to produce vapor that is emitted through a mouthpiece.

SUMMARY

According to one aspect, a vaporizing device can include a pod, which can include a pod battery that is structured to power the pod to produce and emit vapor through a mouthpiece. The pod can be a single-use disposable vaporizing device pod where the pod is not designed to have a reservoir of the pod replaced or refilled within the pod, and the pod battery can be an internal rechargeable pod battery. The vaporizing device can also include a power bank including a power bank battery that is integrated with the power bank. The power bank and the pod can be structured to fit together in a combined configuration. The power bank and the pod can be structured so that the power bank battery charges the pod battery with the power bank and the pod fit together and electrically connected to each other in the combined configuration. The pod can be structured to be used to produce and emit vapor in a standalone configuration by itself without using other components to produce vapor (but this could include actions of a user interacting with the pod such as by puffing to trigger the pod to produce and emit vapor), wherein in the standalone configuration the pod is not fit together with the power bank or electrically connected to the power bank. Also, the pod can be structured to be used in the combined configuration wherein the pod is fit together with the power bank and electrically connected to the power bank. The vaporizing device can be a mobile vaporizing device.

According to another aspect, aa technique can include using a first pod to produce vapor through a first mouthpiece of the first pod while the first pod is fit together with a power bank in a combined configuration. The first pod can be a single use vaporizing device pod. The power bank can charge a first pod battery of the first pod while the first pod is fit together with the power bank in the combined configuration. The power bank can include a power bank battery that is integrated with the power bank.

The technique can further include removing the first pod from the power bank so that the first pod is in a standalone configuration by itself without using other components to produce vapor, wherein in the standalone configuration the first pod is not electrically connected to the power bank or another power source. The technique can also include using the first pod to produce vapor through the first mouthpiece of the first pod while the first pod is in the standalone configuration.

Additionally, the technique can include using a second pod to produce vapor through a second mouthpiece of the second pod while the second pod is fit together with the power bank in the combined configuration. The second pod can be a single use vaporizing device pod. The power bank can charge a second pod battery of the second pod while the second pod is fit together with the power bank in the combined configuration.

The technique can further include removing the second pod from the power bank so that the second pod is in a standalone configuration by itself without using other components to produce vapor, wherein in the standalone configuration the second pod is not electrically connected to the power bank or another power source. Additionally, the technique can include using the second pod to produce vapor through the second mouthpiece of the second pod while the second pod is in the standalone configuration.

In another aspect, a vaporizing device pod can include a reservoir holding a material to be vaporized. The reservoir can be designed to be non-refillable in normal use of the vaporizing device pod. A pod battery can be integrated with the vaporizing device pod, and the pod battery can be rechargeable. The pod can also include an atomizer powered by the pod battery, and a mouthpiece. The pod battery can be structured to power the atomizer to produce vapor that is emitted from the mouthpiece. The vaporizing device pod can be structured to be fitted with a power bank that is battery powered to recharge the pod battery in a combined configuration. The vaporizing device pod can be configured to power the atomizer in the combined configuration and in a standalone configuration by itself without using other components to produce vapor, wherein in the standalone configuration the vaporizing device pod is not fitted with or electrically connected to the power bank or another electrical power source outside the vaporizing device pod.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

BRIEF DESCRIPTION OF THE DRAWINGS

The description and drawings may refer to the same or similar features in different drawings with the same reference numbers.

DETAILED DESCRIPTION

I. Example Vaporizing Device Designs

Figure 1:
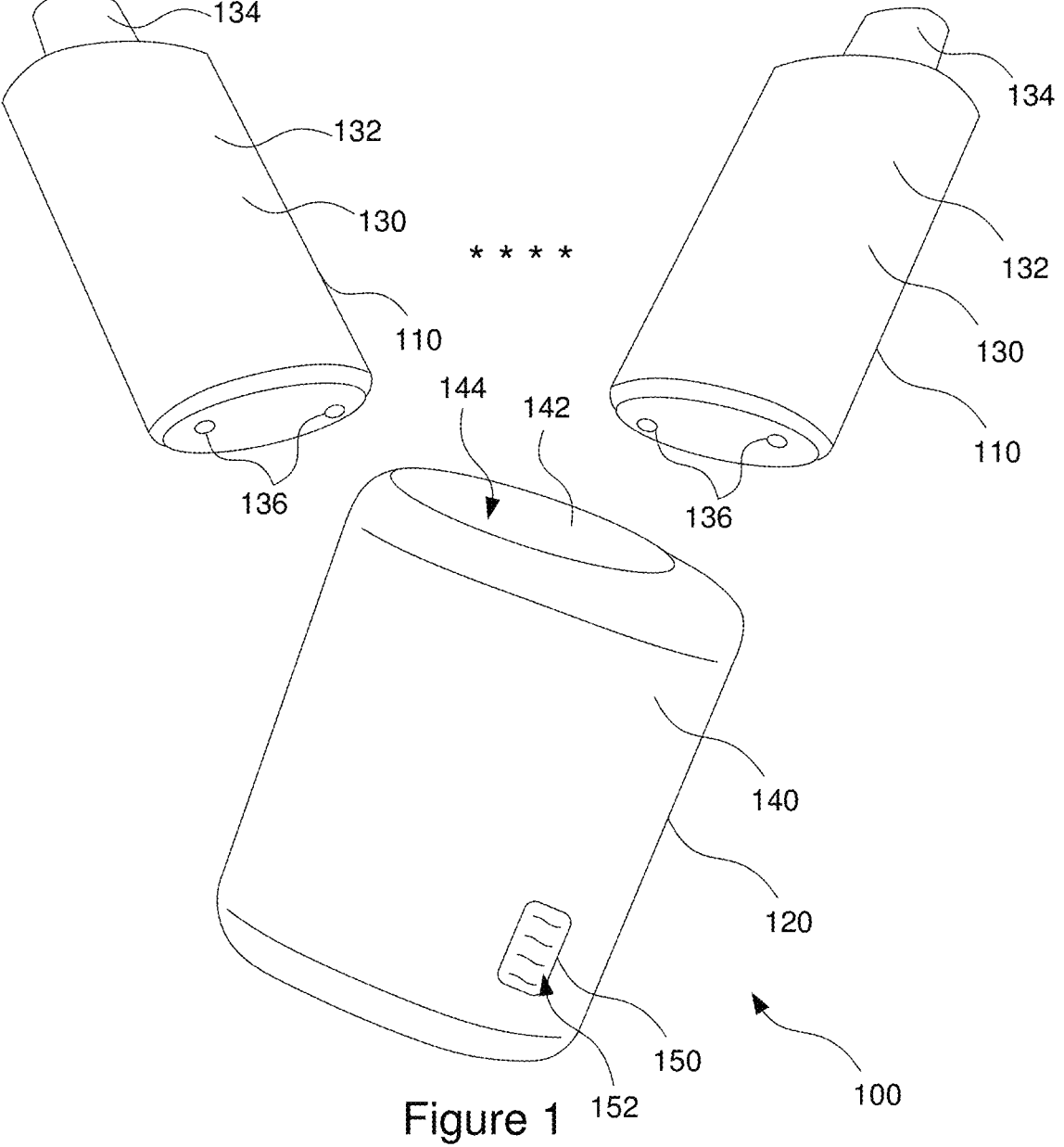
FIG. 1 is a perspective view of a vaporizing device with multiple pods each in a standalone configuration with the pods and a power bank being separated from each other.
Figure 2:
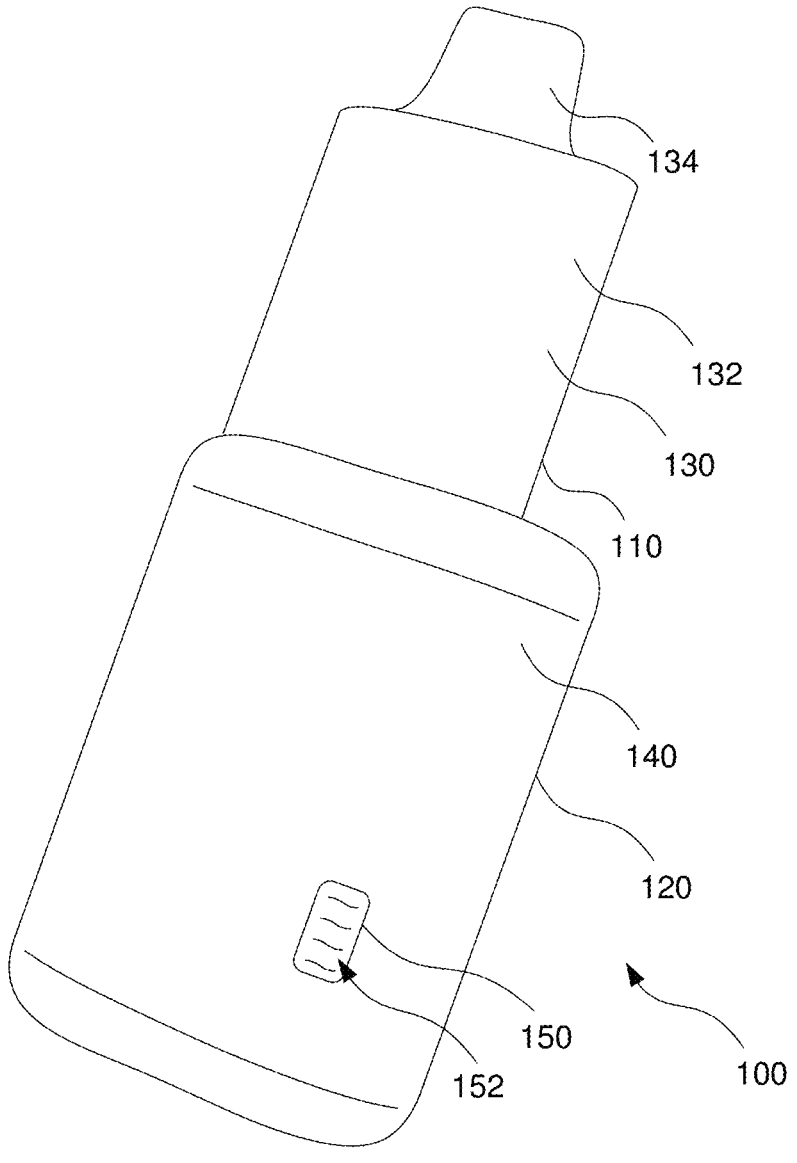
FIG. 2 is a perspective view of the vaporizing device of FIG. 1 with the pod partially fit together with the power bank between the standalone configuration and a combined configuration.
Figure 3:
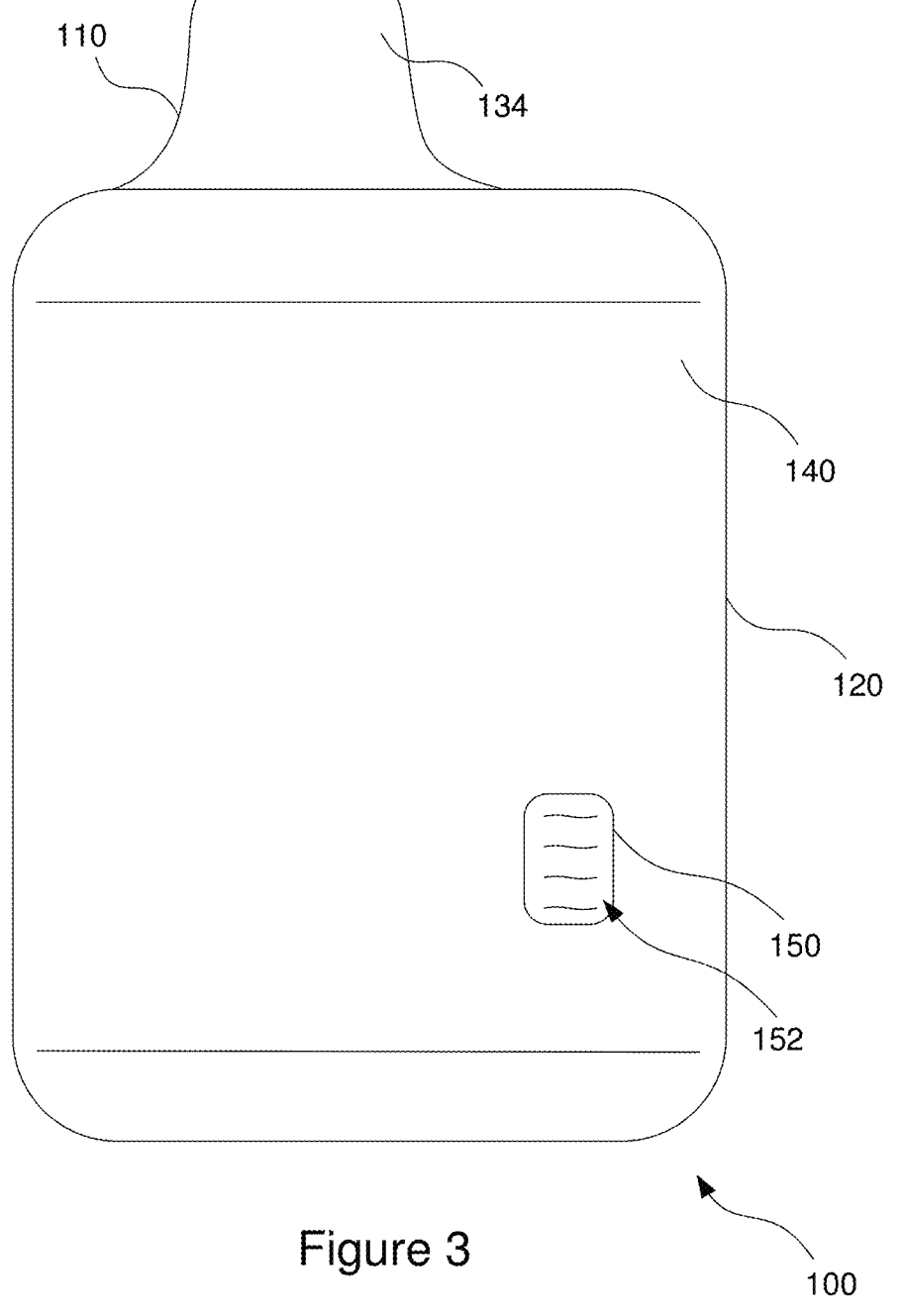
FIG. 3 is a front view of the vaporizing device of FIG. 1 with the pod and power bank fit together in the combined configuration.

Referring to FIGS. 1-3, a vaporizing device 100 can include one or more pods 110 (such as a single pod, two pods, or more pods, and possibly many pods, as illustrated in FIG. 1) and a power bank 120. Each of the pods may be the same, or they may have some differences, such as being filled with different vaporizing materials, such as materials with different flavors. For the sake of simplicity, a single pod will be discussed herein, with the understanding that the vaporizing device can include multiple pods that can be switched for each other in the vaporizing device. The pod 110 can be structured to produce an aerosol mist or vapor from vaporizing material such as liquid vaporizing material sometimes call e-liquid or e-juice in an internal reservoir in the pod 110. The pod 110 can be a single use pod, which can be a pod that is able to be used to produce vapor in a standalone configuration by itself without using other components to produce vapor, where the single use pod is only designed to be used until the vaporizing material in the pod is consumed, after which the pod is intended to be disposed. In other words, the internal reservoir is not designed to be refilled or replaced in the ordinary use of the single-use pod. As noted above, many pods 110 can be used with the same power bank 120, and the power bank 120 can continue to be used with additional pods so long as the power bank 120 is still working correctly. Indeed, a power bank 120 may continue to be used with additional pods 110 long after the vaporizing material of some single-use pods 110 that were used with that power bank 120 have been used up and a user has disposed of those used-up pods.

The pod 110 can include a body 130, which can include a housing 132, which can house the internal reservoir and other components to produce the vapor from the vaporizing material in the reservoir, including a battery, circuitry, and an atomizer. Vapor produced by the pod 110 can exit the pod 110 through a conduit in a mouthpiece 134, which can be attached to the body 130. The pod 110 can also include a power input port 136, which can be a connector that can include electrical connections, such as a pair of electrical connections positioned to be aligned with corresponding connections of a power output port in the power bank 120. The pod 110 can be structured so that the pod 110 can produce vapor in a standalone configuration by itself without using other components to produce vapor, wherein the pod is not fit together with the power bank 120, nor is the pod electrically connected to the power bank 120 or another power source outside the pod 110.

The power bank 120 can include a housing 140, which can house internal components of the power bank 120, which may include a power bank battery and electrical circuitry. The housing 140 can define a seat 142, which can define an aperture 144 into which at least a portion of the pod 110 can be inserted when the pod 110 and the power bank 120 are fit together in the combined configuration of FIG. 3. In the combined configuration of FIG. 3, the power bank 120 can charge the internal pod battery of the pod 110. Also, the pod 110 can be used to produce vapor that exits through its mouthpiece 134 while the pod 110 is fit together with the power bank 120 in the combined configuration. Thus, the pod 110 can be a single-use disposable pod that can produce vapor through its mouthpiece 134 in a standalone configuration by itself without being connected to anything else, or when fitted together with the power bank 120 in the combined configuration. Indeed, the pod 110 can produce vapor through its mouthpiece 134 while the pod is being charged by the power bank 120 in the combined configuration. Additionally, the power bank 120 can be connected to a power source and charge its own power bank battery at the same time as the power bank 120 charges the pod battery of the pod 110 in the combined configuration (and the power bank 120 may charge the power bank battery and the pod battery while the pod 120 is also producing vapor through its mouthpiece 134).

The power bank 120 can also include a battery status indicator 150, which can display content 152 that indicates a charge status of the power bank battery. For example, the battery status indicator may include a display screen that displays a percentage, which can represent the power bank battery's current charge as a percentage of its full charge. Similarly, the pod 110 can include a battery status indicator (not shown), which may be visible (such as by being positioned on the pod 110 so that the indicator is visible on the top of the pod 110, pointing away from the seat 142 of the power bank 120 while the pod 110 and the power bank 120 are in the combined configuration. Thus, either or both of the pod 110 and the power bank 120 may include a battery status indicator. These battery status indicators may be different types from each other (with the pod having a different type of indicator from the power bank) or the same type as each other. Also, the battery status indicators can each be one of various types of indicators that is able to indicate a charge status of the corresponding battery, such as a series of indicator lights (e.g., light emitting diode (LED) lights), an LED screen, a liquid crystal display (LCD) screen, or some other type of indicator.

As illustrated in FIG. 1, the outer-facing side surface of the housing 132 of the body 130 of the pod 110 can have a non-circular cross-sectional shape that can match a cross-sectional shape of an inner-facing side surface of the seat 142 of the power bank 120. Thus, the pod 110 can slide into the seat 142 in an orientation wherein the power input port 136 of the pod 110 will be aligned to contact corresponding connections of the power output port in the power bank 120 when the pod 110 is fully inserted in the seat 142 in the combined configuration illustrated in FIG. 3.

The power bank 120 can also have a power input port, which can be connected to a power cord to charge the power bank from a power source, such as an alternating current power source (such as a power outlet) or a direct current power source (such as a laptop computer, a USB power supply port, or some other power source).

The vaporizing device 100 can give a user of the vaporizing device 100 multiple options for different ways of transporting and using the vaporizing device 100, such as the following: the option of just carrying the pod 110 with the user for compactness so the pod 110 can be used in the standalone configuration, the option to carry the pod 110 fitted together with the power bank 120 for longer battery life, and the option to carry the pod 110 and the power bank 120 separately so the power bank 120 can be used to recharge the pod battery of the pod 110 when needed.

II. Example Vaporizing Device Components

Figure 4:
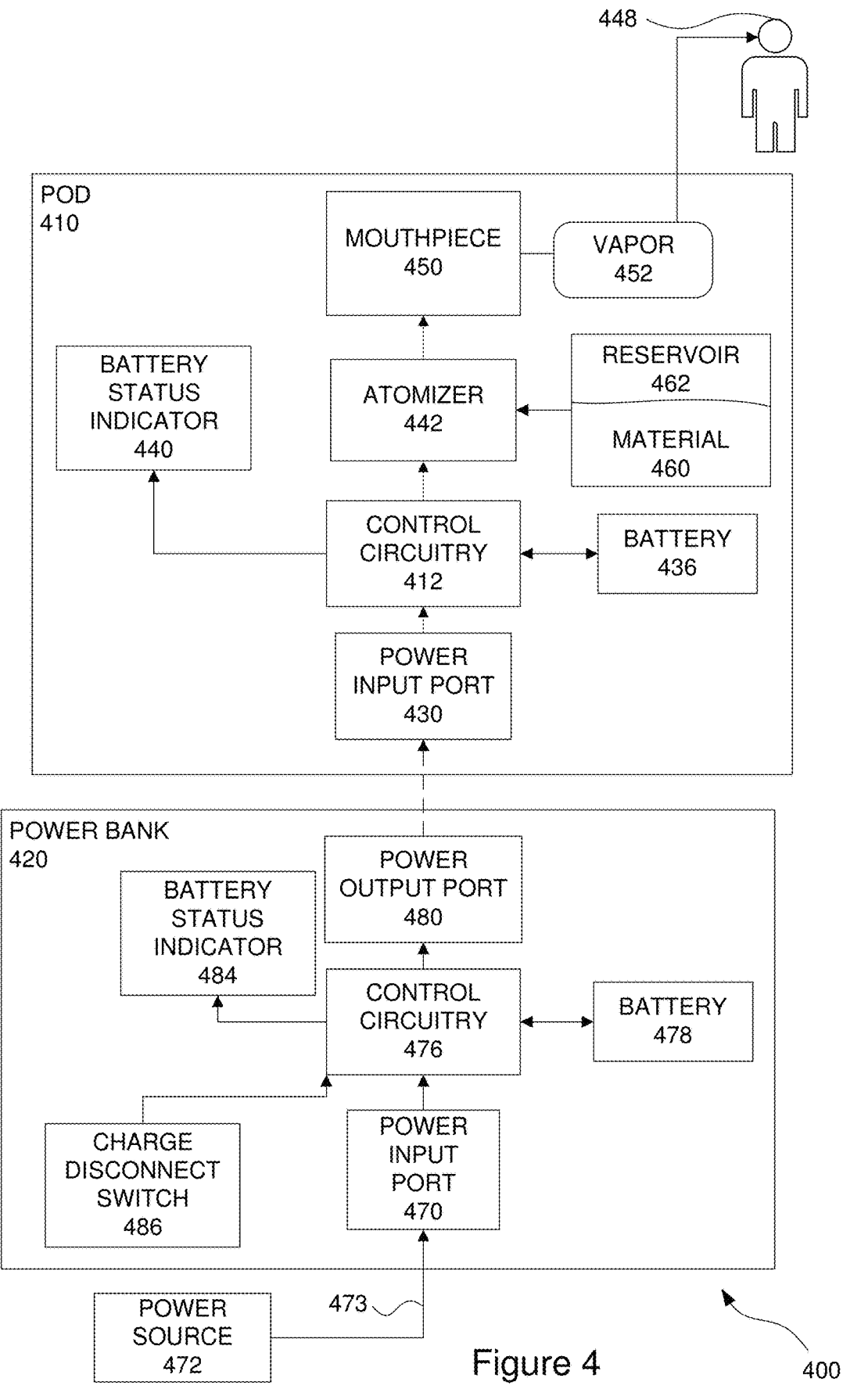
FIG. 4 is a schematic view illustrating components of a vaporizing device.

Referring now to FIG. 4, components of a vaporizing device 400 will be discussed. As with the vaporizing device 100, the vaporizing device 400 is an example, and implementations may include different features than the vaporizing device 100 and/or the vaporizing device 400. The vaporizing device 400 may be the same as the vaporizing device 100 discussed above. However, the vaporizing device 400 may be implemented with different geometrical configurations than the vaporizing device 100 illustrated in FIGS. 1-3 and discussed above. Similarly, the vaporizing device 100 may have different components than those discussed below for the vaporizing device 400 and illustrated in FIG. 4.

The vaporizing device 400 can include a pod 410 and a power bank 420. The pod 410 can include a power input port 430, which can be selectively connected to receive power from the power bank 420. The pod 410 can also include control circuitry 412, which can be connected to the power input port 430, so that the control circuitry 412 can control the application of electric power from the power input port 430 to other components of the pod, including a pod battery 436. The pod battery 436 can be a rechargeable battery, such as a lithium-ion battery or an alkaline battery. In one example, the pod battery 436 can be a two-hundred and eighty milliamp hour type-c rechargeable battery.

The pod 410 can also include a battery status indicator 440, which can be controlled by the control circuitry. For example, the control circuitry can monitor the status of the pod battery 436, with the control circuitry being configured to send signals to the battery status indicator 440 to indicate a status of the pod battery 436. For example, the battery status indicator 440 may be a series of lights such as LED lights, with more lights being lit indicating a higher charge for the pod battery 436. As another example, the battery status indicator 440 may be a display screen such as an LCD or an LED display, which may display a current percentage charge of the pod battery 436.

The control circuitry 412 can also be connected to an atomizer 442, such as an atomizer with a heating element. For example, the heating element may include a 1.2-ohm mesh coil or some other type of heating element. The control circuitry 412 can be configured to direct electric power from the pod battery 436 and/or the power input port 430 to the atomizer 442. For example, the control circuitry 412 may include a puff sensor, which can sense that a user 448 is drawing air through a mouthpiece 450 of the pod 410. In response to sensing such a puff, the control circuitry 412 can supply power to the atomizer 442 to power the atomizer 442 to produce vapor 452 from vaporizing material 460 in a reservoir 462. For example, the reservoir 462 can hold ten milliliters of real e-liquid, which may provide about five thousand puffs during the lifetime of the pod 410. Accordingly, the atomizer 442 can vaporize the vaporizing material 460, producing the vapor 452, which can flow from the atomizer through a conduit that extends to and through the mouthpiece 450 to the mouth of the user 448.

The power bank 420 can include a power input port 470, which can connect to a power source 472 outside the power bank 420. For example, the power input port 470 of the power bank may be a USB-C port, some other type of USB port, or some other type of non-USB port. A power cord 473 can connect the power input port 470 to the power source 472. For example, the power source may be an alternating current electrical outlet, and the power cord 473 may include a rectifier, or AC-DC converter, to convert the alternating current from the outlet to direct current to be used by the power bank 420.

The power input port 470 can be connected to control circuitry 476, which can control delivery of the electricity from the power input port to a power bank battery 478, and from the power input port 470 and/or the power bank battery 478 to a power output port 480. The power bank battery 478 can be any of various different kinds of batteries, such as alkaline batteries or lithium-ion batteries. In one example, the power bank battery can be a 600-milliamp hour type-c rechargeable battery. The power output port 480 can be configured to electrically connect to the power input port 430 of the pod 410 when the pod 410 is fit with the power bank 420 (such as if the pod 410 is at least partially seated in a seat of the power bank 420 and/or the power bank 420 is at least partially seated in a seat of the pod 410). The power bank 420 can also include a battery status indicator 484. The battery status indicator 484 can be controlled by the control circuitry 476, which can monitor the status of power bank battery 478 and send signals to the battery status indicator 484, prompting the battery status indicator to indicate a current status of the power bank battery 478. For example, the battery status indicator 484 can include one or more indicator lights such as LED lights, an LCD display, an LED display, and/or some other type of indicator.

The power bank 420 can also include a charge disconnect switch 486. The charge disconnect switch 486 can be a manually operated switch, such as a switch that is operated by a pushbutton mechanism, a slider switch mechanism, or a rocker switch mechanism. The charge disconnect switch 486 can be manually actuated to inhibit the flow of electricity from the power bank 420 to the pod 410. For example, for some types of pods, the pod 410 may not operate properly to produce vapor 452 while the battery of the pod 410 is being charged. Accordingly, a user 448 can actuate the charge disconnect switch 486 to disconnect the charge during each use of the pod 410 to produce vapor 452 while the pod 410 is fitted with the power bank 420.

Alternatively, the charge may be disconnected in some other way. For example, the control circuitry 412 of the pod 410 may respond to sensing a puff by disconnecting the charge from the power bank 420 and then sending electrical power from the pod battery 436 to the atomizer 442, to produce vapor 452. Indeed, the vaporizing device 400 may be in different states while the pod 410 is fitted with or docked at the power bank 420. For example, the power bank 420 may be charging the pod battery 436 from the power bank battery 478 and/or directly from the power source 472. As an example, the control circuitry 476 of the power bank 420 may determine a state or charge level of the power bank battery 478, and also determine whether the power bank 420 is electrically connected to the power source 472. The control circuitry 476 of the power bank 420 may use the results of these determinations to direct power from either the power bank battery 478 or the power source 472 to the power output port 480 of the power bank 420. For example, the control circuitry 476 may always provide power directly from the power source 472 to the power output port 480 (without such directly supplied power going through the power bank battery 478) if the power source 472 is connected to the power bank 420. However, if the power source 472 is not connected to the power bank 420, then the control circuitry 476 can supply electrical power from the power bank battery 478 to the power output port 480. In another scenario, the control circuitry 476 may provide power from the power bank battery 478 to the power output port 480 so long as the charge in the power bank battery 478 is above a predetermined threshold level such as a level below which charging from the power bank battery 478 is not feasible (e.g., 0%, 5%, 20% charge or some other charge level), and only supply power to the power output port 480 directly from the power source 472 if the charge of the power bank battery 478 is below the threshold level and the power source 472 is connected to the power bank 420.

The power bank 420 may supply power to the pod 410 while the pod 410 is not being used to produce vapor 452 and/or while the pod 410 is being used to produce vapor 452. While the pod 410 is docked at the power bank 420 and is being used to produce vapor 452, the control circuitry 412 of the pod 410 may direct the power from the power bank 420 directly to the atomizer 442 (without such directly supplied power going through the pod battery 436) and/or to the pod battery 436. While the pod 410 is docked at the power bank 420 and is not being used to produce vapor 452, the control circuitry 412 of the pod 410 may direct the power from the power bank 420 to the pod battery 436 to charge the pod battery.

As an example, the control circuitry 412 of the pod 410 may determine a state or charge level of the pod battery 436, and also determine whether the pod 410 is electrically connected to the power bank 420. The control circuitry 412 of the pod 410 may use the results of these determinations to direct power from either the pod battery 436 or from the power bank 420 (via the power input port 430) to the atomizer 442. For example, the control circuitry 412 may always provide power from the power bank 420 directly to the atomizer 442 (without the directly supplied power going through the pod battery 436) if the power bank 420 is connected to the pod 410 and is supplying sufficient electricity to the pod 410. However, if the power bank 420 is not connected to the pod 410 or is not supplying sufficient electricity to the pod 410, then the control circuitry 412 can supply electrical power from the pod battery 436 to the atomizer 442. In another scenario, the control circuitry 412 may provide power from the pod battery 436 to the atomizer 442 (rather than supplying power directly from the power bank 420) so long as the charge in the pod battery 436 is above a predetermined threshold level such as a level below which powering the atomizer 442 from the pod battery 436 is not feasible (e.g., 0%, 5%, 20% charge or some other charge level), and only supply power to the atomizer 442 directly from the power bank 420 if the charge of the pod battery 436 is below the threshold level and the power bank 420 is connected to the pod 410. These states of the control circuitry 412 can be used with any of different states of the control circuitry 476 discussed above, as appropriate for those states of each control circuitry and the states of the different components and connections between the components.

While the pod 410 is not connected to the power bank 420 or some other source of power for the pod 410 in the standalone configuration for the pod 410, the control circuitry 412 of the pod 410 can supply electricity from the pod battery 436 to the atomizer 442 to produce vapor 452, so long as there is sufficient charge in the pod battery 436.

Also, in the configurations and states discussed above, the control circuitries may cease providing power from a battery if that battery does not have sufficient charge to supply the power, and the control circuitries may cease charging a battery if the battery has achieved an upper threshold level of charge (such as a 100% charge level, or some lower charge level (e.g., 80% charge level) that is predetermined to be a better upper charge level for prolonging the overall life of the battery).

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts and other drawings may not show the various ways in which particular techniques and/or components can be used in conjunction with other techniques and/or components.

III. Aspects

Different aspects will be discussed herein, with the understanding that different features discussed in this section and elsewhere in this disclosure can be used with each other in any combination not precluded by the discussion herein.

According to one aspect, a vaporizing device can include a pod, which can include a pod battery that is structured to power the pod to produce and emit vapor through a mouthpiece. The pod can be a single-use disposable vaporizing device pod where the pod is not designed to have a reservoir of the pod replaced or refilled within the pod, and the pod battery can be an internal rechargeable pod battery. The vaporizing device can also include a power bank including a power bank battery that is integrated with the power bank. The power bank and the pod can be structured to fit together in a combined configuration. The power bank and the pod can be structured so that the power bank battery charges the pod battery with the power bank and the pod fit together and electrically connected to each other in the combined configuration. The pod can be structured to be used to produce and emit vapor in a standalone configuration by itself without using other components to produce vapor, such as wherein the pod is not fit together with the power bank or electrically connected to the power bank. Also, the pod can be structured to be used in the combined configuration wherein the pod is fit together with the power bank and electrically connected to the power bank. The vaporizing device can be a mobile vaporizing device.

The pod can be seated at least partly in an aperture of the power bank in the combined configuration. The combined configuration can include at least a portion of the mouthpiece of the pod protruding away from the power bank.

The power bank can include a charging connection that is structured to connect the power bank to an electrical power source to charge the power bank battery. The charging connection can include a charging port in the power bank and the vaporizing device can further include a power cord connected to the charging port. The vaporizing device can be structured to charge the power bank battery and the pod battery at the same time. The power bank can include a power bank charge indicator that presents a charge status of the power bank battery. Also, the pod can include a pod charge indicator that presents a charge status of the pod battery. The pod charge indicator can be a visible indicator that is structured to be visible while the pod and the power bank are fit together.

Also, the power bank can be designed to be useable with multiple different pods at different times. The pod can be a first pod, the pod battery can be a first pod battery, the mouthpiece can be a first mouthpiece, and the vaporizing device can further include a second pod that is useable with the power bank for the power bank to provide power to the second pod. The second pod can include a second pod battery that is structured to power the second pod to produce and emit vapor through a second mouthpiece. The second pod can be a single-use disposable vaporizing device pod, and the second pod battery can be an internal rechargeable pod battery. The vaporizing device can include more pods, such as at least three pods.

Figure 5:
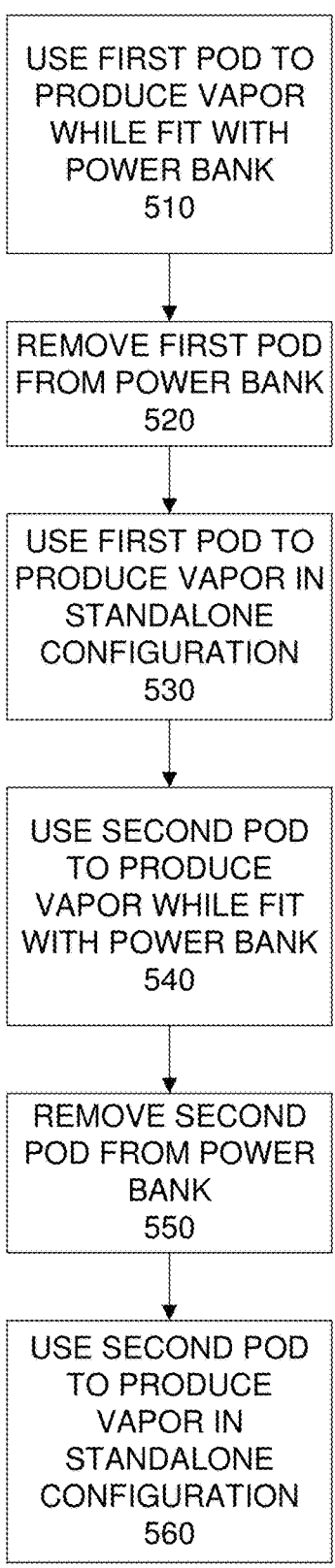
FIG. 5 is a flowchart illustrating an example technique according to the disclosure herein.

According to another aspect, and referring to FIG. 5, a technique can include using 510 a first pod to produce vapor through a first mouthpiece of the first pod while the first pod is fit together with a power bank in a combined configuration. The first pod can be a single use vaporizing device pod. The power bank can charge a first pod battery of the first pod while the first pod is fit together with the power bank in the combined configuration. The power bank can include a power bank battery that is integrated with the power bank.

The technique can further include removing 520 the first pod from the power bank so that the first pod is in a standalone configuration by itself without using other components to produce vapor, where in the standalone configuration the first pod is not electrically connected to the power bank or another power source. The technique can also include using 530 the first pod to produce vapor through the first mouthpiece of the first pod while the first pod is in the standalone configuration.

Additionally, the technique can include using 540 a second pod to produce vapor through a second mouthpiece of the second pod while the second pod is fit together with the power bank in the combined configuration. The second pod can be a single use vaporizing device pod. The power bank can charge a second pod battery of the second pod while the second pod is fit together with the power bank in the combined configuration.

The technique can further include removing 550 the second pod from the power bank so that the second pod is in a standalone configuration by itself without using other components to produce vapor, where in the standalone configuration the second pod is not electrically connected to the power bank or another power source. Additionally, the technique can include using 560 the second pod to produce vapor through the second mouthpiece of the second pod while the second pod is in the standalone configuration.

The first pod and the second pod can each be single use pods. The technique can further include disposing of the first pod, which may be done after vaporizing material in the first pod has been used. The disposing of the first pod can be done without vaporizing material in the first pod having been refilled. The technique can also include disposing of the second pod after vaporizing material in the second pod has been used. And the disposing of the second pod can be done without vaporizing material in the second pod having been refilled. The first pod and the second pod can each produce a different vapor flavor.

The combined configuration can include at least one inserting member (such as at least part of the first pod or the second pod) being at least partially removably seated in at least one receiving member (such as a seat in the power bank), and wherein the standalone configuration includes the at least one inserting member being separated from the at least one receiving member. The combined configuration can include at least a portion of the first mouthpiece or the second mouthpiece protruding away from the power bank.

The power bank can include a power bank charge indicator that presents a charge status of the power bank battery. Also, the first pod and the second pod can each include a power bank charge indicator that presents a pod battery charge status.

In another aspect, a vaporizing device pod can include a reservoir holding a material to be vaporized. The reservoir can be designed to be non-refillable in normal use of the vaporizing device pod. A pod battery can be integrated with the vaporizing device pod, and the pod battery can be rechargeable. The pod can also include an atomizer powered by the pod battery, and a mouthpiece. The pod battery can be structured to power the atomizer to produce vapor that is emitted from the mouthpiece. The vaporizing device pod can be structured to be fitted with a power bank that is battery powered to recharge the pod battery in a combined configuration. The vaporizing device pod can be configured to power the atomizer in the combined configuration and in a standalone configuration wherein the vaporizing device pod is by itself without needing other components and not fitted with or electrically connected to the power bank or another electrical power source outside the vaporizing device pod.

At least a portion of the vaporizing device pod can be designed to be removably inserted into an aperture of the power bank in the combined configuration, with electrical connections of the pod being structured to contact electrical connections of the power bank in the combined configuration.

While particular embodiments are discussed above, it will be understood by those skilled in the art that various changes in form and details may be made therein without departing from the spirit and scope of the invention.

We claim:

1. A method comprising:
   using a first pod to produce vapor through a first mouthpiece of the first pod while the first pod is fit together with a power bank in a first combined configuration, the first pod being a single use vaporizing device pod, the power bank charging a first pod battery of the first pod while the first pod is fit together with the power bank in the first combined configuration, the power bank including a power bank battery;
   removing the first pod from the power bank so that the first pod is in a first standalone configuration by itself without using other components to produce vapor, wherein in the first standalone configuration the first pod is not electrically connected to the power bank or another power source other than the first pod battery of the first pod;
   using the first pod to produce vapor through the first mouthpiece of the first pod while the first pod is in the first standalone configuration;
   using a second pod to produce vapor through a second mouthpiece of the second pod while the second pod is fit together with the power bank in a second combined configuration, the second pod being a single use vaporizing device pod, the power bank charging a second pod battery of the second pod while the second pod is fit together with the power bank in the second combined configuration;
   removing the second pod from the power bank so that the second pod is in a second standalone configuration by itself without using other components to produce vapor, wherein in the second standalone configuration the second pod is not electrically connected to the power bank or another power source other than the second pod battery of the second pod; and
   using the second pod to produce vapor through the second mouthpiece of the second pod while the second pod is in the second standalone configuration.

2. The method of claim 1, further including disposing of the first pod without vaporizing material in the first pod having been refilled.

3. The method of claim 1, wherein the first pod and the second pod each produce a different vapor flavor.

4. The method of claim 1, wherein while using the first pod to produce vapor through the first mouthpiece of the first pod and while the first pod is fit together with the power bank in the first combined configuration, the first pod is at least partially removably seated in the power bank or the power bank is at least partially removably seated in the first pod.

5. The method of claim 1, wherein the first or second combined configuration includes at least a portion of the first mouthpiece or the second mouthpiece, respectively, protruding away from the power bank.

6. The method of claim 1, wherein the power bank includes a power bank charge indicator that presents a charge status of the power bank battery.

7. The method of claim 1, wherein the first pod and the second pod each includes a power bank charge indicator that presents a respective pod battery charge status.

* * * * *